United States Patent
Nam et al.

(10) Patent No.: US 10,135,665 B2
(45) Date of Patent: Nov. 20, 2018

(54) TRANSCEIVING METHOD AND APPARATUS FOR MODULATION SIGNAL TRANSMISSION IN FILTER BANK MULTI-CARRIER COMMUNICATION SYSTEM

(71) Applicants: Samsung Electronics Co., Ltd., Suwon-si, Gyeonggi-do (KR); Industry-Academic Cooperation Foundation Yonsei University, Seoul (KR)

(72) Inventors: Hyungju Nam, Seoul (KR); Sooyong Choi, Seoul (KR); Chanhong Kim, Hwaseong-si (KR); Moonchang Choi, Seoul (KR); Sangwoo Kim, Seoul (KR)

(73) Assignees: Samsung Electronics Co., Ltd., Suwon-si (KR); Industry-Academic Cooperation Foundation Yonsei University, Seoul (KR)

( * ) Notice: Subject to any disclaimer, the term of this patent is extended or adjusted under 35 U.S.C. 154(b) by 0 days.

(21) Appl. No.: 15/025,094

(22) PCT Filed: Sep. 25, 2014

(86) PCT No.: PCT/KR2014/008949
§ 371 (c)(1),
(2) Date: Mar. 25, 2016

(87) PCT Pub. No.: WO2015/046907
PCT Pub. Date: Apr. 2, 2015

(65) Prior Publication Data
US 2016/0269217 A1    Sep. 15, 2016

(30) Foreign Application Priority Data

Sep. 27, 2013  (KR) .................. 10-2013-0115649
Sep. 24, 2014  (KR) .................. 10-2014-0127722

(51) Int. Cl.
  H04K 1/10      (2006.01)
  H04L 27/28     (2006.01)
  (Continued)

(52) U.S. Cl.
  CPC .......... H04L 27/362 (2013.01); H04L 27/264 (2013.01); H04L 27/2628 (2013.01); H04L 27/34 (2013.01); H04L 27/36 (2013.01)

(58) Field of Classification Search
  CPC ....... H04L 27/362; H04L 27/36; H04L 27/34; H04L 27/2628; H04L 27/264; H04L 27/2631
  (Continued)

(56) References Cited

U.S. PATENT DOCUMENTS 9,166,858 B2 * 10/2015 Dandach ............. H04L 27/2631
2005/0047513 A1 * 3/2005 Vitenberg ........... H04L 27/0004
                                                        375/260
  (Continued)

FOREIGN PATENT DOCUMENTS

CN    101867547 A    10/2010
CN    102904854 A    1/2013

OTHER PUBLICATIONS

Rohit Datta et al., 'FBMC and GFDM Interference Cancellation Schemes for Flexible Digital Radio PHY Design', 2011 14th Euromicro Conference on Digital System Design (DSD), pp. 335-339, Sep. 2, 2011.
(Continued)

Primary Examiner — Phuong Phu
(74) Attorney, Agent, or Firm — Jefferson IP Law, LLP

(57) ABSTRACT

The present invention relates to a transceiving method and apparatus that enable QAM signal transmission in a filter bank multi-carrier (FBMC) communication system and provides, in particular, a transceiving method and apparatus that
(Continued)

enable quadrature amplitude modulation (QAM) signal transmission without intrinsic interference by separating filtering between a sub-carrier having an even index and a sub-carrier having an odd index, and superimposing and transmitting sub-carriers filtered by means of separation. The thus-rendered present invention is a transmission method in the FBMC communication system, the method comprising the steps of: dividing at least two QAM signals into a plurality of groups; performing filtering on each of the plurality of groups; and superimposing and transmitting the QAM signal in the plurality of groups filtered on a time axis. The present invention relates to a transmission method and apparatus, and a corresponding reception method and apparatus.

20 Claims, 15 Drawing Sheets

(51) Int. Cl.
  *H04L 27/36* (2006.01)
  *H04L 27/34* (2006.01)
  *H04L 27/26* (2006.01)
(58) Field of Classification Search
  USPC .................................. 375/260, 261, 295, 298
  See application file for complete search history.

(56) References Cited

U.S. PATENT DOCUMENTS

| | | |
|---|---|---|
| 2011/0142152 A1 | 6/2011 | Bellanger |
| 2012/0189036 A1 | 7/2012 | Bellanger |
| 2014/0192925 A1 | 7/2014 | Li |
| 2015/0092885 A1* | 4/2015 | Li .......................... H04L 27/2631 375/296 |

OTHER PUBLICATIONS

R. Zakaria et al., 'On Maximum Likelihood MIMO Detection in QAM-FBMC Systems', 2010 IEEE 21st Annual IEEE International Symposium on Personal Indoor and Mobile Radio Communications (PIMRC), pp. 183-187, Sep. 30, 2010.
R. Zakaria et al., 'A Novel FBMC Scheme for Spatial Multiplexing with Maximum Likelihood Detection', 2010 7th International Symposium on Wireless Communication Systems (ISWCS), pp. 461-465, Sep. 22, 2010.
Sahin et al.; A Survey on Multicarrier Communications: Prototype Filters, Lattice Structures, and Implementation Aspects; XP055366685; https://arxiv.org/pdf/1212.3374.pdf; Jul. 12, 2013.
Chinese Office Action dated Sep. 26, 2018, issued in the Chinese application No. 201480053471.7.

* cited by examiner

FIG. 3
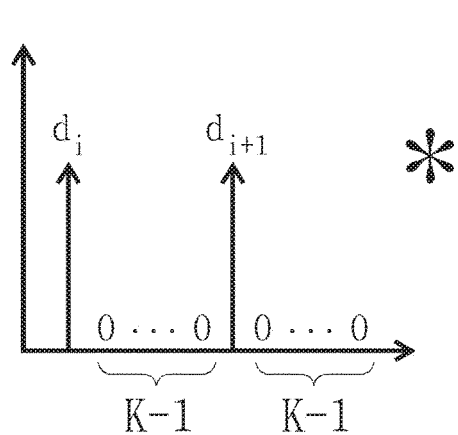 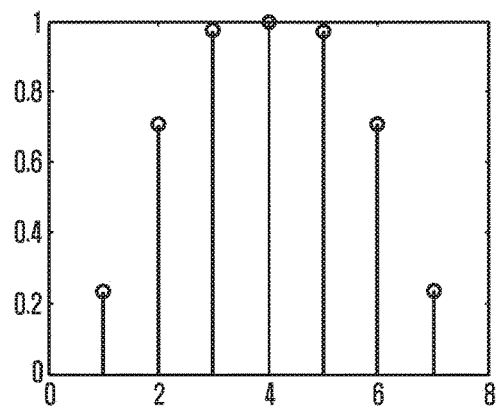

FIG. 6
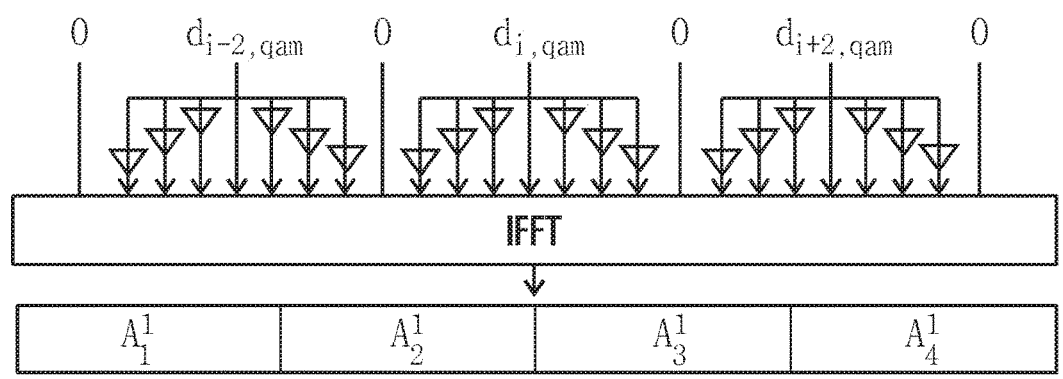
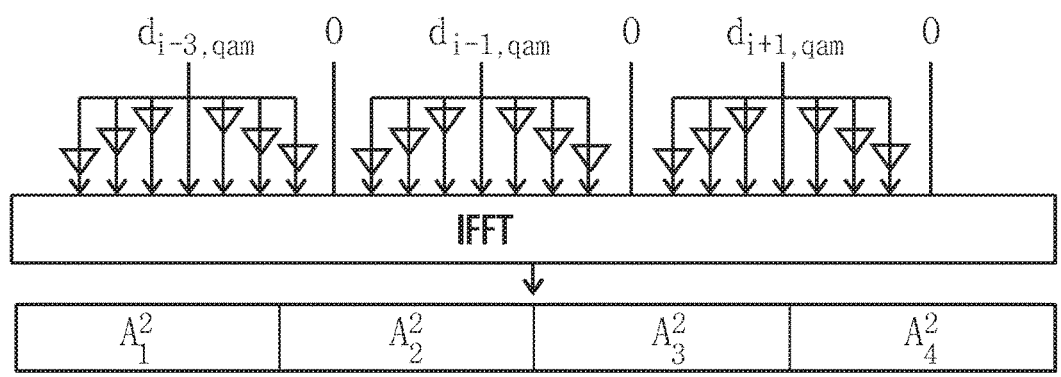

FIG. 9

| A1(even) | A2(even) | A3(even) | A4(even) | A5(even) | A6(even) | A7(even) | A8(even) |
|---|---|---|---|---|---|---|---|
| −A8(odd) | A7(odd) | −A6(odd) | A5(odd) | −A4(odd) | A3(odd) | −A2(odd) | A1(odd) |

FIG. 12

| | | | | | | | | | | | | | | | | | | | | E8(even) | |
| --- | --- | --- | --- | --- | --- | --- | --- | --- | --- | --- | --- | --- | --- | --- | --- | --- | --- | --- | --- | --- | --- |
| | | | | | | | | | | | | | | | | | | | | | E1(odd) |
| | | | | | | | | | | | | | | | | | | D8(even) | D1(odd) | E7(even) | -E2(odd) |
| | | | | | | | | | | | | | | | C8(even) | C1(odd) | D7(even) | -D2(odd) | E6(even) | E3(odd) | |
| | | | | | | | | | | | | | B8(even) | B1(odd) | C7(even) | -C2(odd) | D6(even) | D3(odd) | E5(even) | -E4(odd) | |
| | | | | | A8(even) | A1(odd) | B7(even) | -B2(odd) | C6(even) | C3(odd) | D5(even) | -D4(odd) | E4(even) | E5(odd) | | | | | | | |
| | | | A7(even) | -A2(odd) | B6(even) | B3(odd) | C5(even) | -C4(odd) | D4(even) | D5(odd) | E3(even) | -E6(odd) | | | | | | | | | |
| | | A6(even) | A3(odd) | B5(even) | -B4(odd) | C4(even) | C5(odd) | D3(even) | -D6(odd) | E2(even) | E7(odd) | | | | | | | | | | |
| | A5(even) | -A4(odd) | B4(even) | B5(odd) | C3(even) | -C6(odd) | D2(even) | D7(odd) | E1(even) | -E8(odd) | | | | | | | | | | | |
| A4(even) | A5(odd) | B3(even) | -B6(odd) | C2(even) | C7(odd) | D1(even) | -D8(odd) | | | | | | | | | | | | | | |
| A3(even) | -A6(odd) | B2(even) | B7(odd) | C1(even) | -C8(odd) | | | | | | | | | | | | | | | | |
| A2(even) | A7(odd) | B1(even) | -B8(odd) | | | | | | | | | | | | | | | | | | |
| A1(even) | -A8(odd) | | | | | | | | | | | | | | | | | | | | |

TRANSCEIVING METHOD AND APPARATUS FOR MODULATION SIGNAL TRANSMISSION IN FILTER BANK MULTI-CARRIER COMMUNICATION SYSTEM

TECHNICAL FIELD

The present invention relates to a method and apparatus for transmitting/receiving Quadrature Amplitude Modulation (QAM) signals in a Filter Bank-based Multicarrier (FBMC) system and, in particular, to a method and apparatus for transmitting/receiving the QAM signals without intrinsic interference by filtering even-numbered and odd-numbered subcarriers separately and transmitting the signals on the subcarriers that are orthogonal to each other using the orthogonality of filters.

BACKGROUND ART

Recently, much research has been conducted on the Filter Bank-based Multicarrier (FBMC) communication scheme as one of the next generation communication technologies for transmitting high quality data at a high speed and replacing Orthogonal Frequency Division Multiplexing (OFDM) technology. FBMC is superior to OFDM in terms of low out-of-band radiation and reduction of the number of guard subcarriers while meeting the spectrum mask requirement; and this makes it possible to modulate/demodulate the signals with Cyclic Prefix (CP), resulting in improvement of spectral efficiency and robustness against frequency synchronization error.

The conventional FBMC communication systems may be classified into (1) a transmission/reception method in which a time domain polyphase network (PNN) follows Inverse Fast Fourier Transform (IFFT) and (2) a transmission/reception method in which a frequency domain frequency spreader and overlap/sum structure precedes the IFFT. The technology of (1) implements a time domain convolution operation with a filtering as a sum of the length of M weighted sums and then implements the offset-QAM (OQAM) by applying two PPN modules through a time difference. At this time, the receiver uses a time domain equalizer because the transmitter performs time domain filtering. The technology of (2) performs oversampling and filtering with prototype filters in the frequency domain, IFFT of length KM, and overlapping transmission using an adder and memory. At this time, the receiver uses a one-tap equalizer because the transmitter performs filtering in the frequency domain.

The technology of (2) is described in more detail hereinafter.

FIG. 1 is a block diagram illustrating a transmitter for use in a conventional FBMC communication system, and FIG. 2 is a diagram illustrating a signal flow in the transmitter for use in the conventional FBMC communication system when K=4.

Referring to FIG. 1, the transmission signal d(n) consists of M Offset Quadrature Amplitude Modulation (OQAM) signals d(mM). The OQAM signals are converted by a Serial-to-Parallel (S/P) converter 110, and each OQAM signal $d_i$(mM) is spread by a frequency spreader 120 in the frequency domain as shown in FIG. 2. The spreader 120 spreads each OQAM signal into the KM signals in the whole frequency band by multiplying each OQAM signal by 2K−1 frequency domain filter coefficients using the prototype filter. This is called frequency domain filtering.

The filtered signal is IFFT-ed by an IFFT 130. Finally, the output signals of the IFFT 130 are overlapped by a Parallel-to-Serial (P/S) and Overlap/Sum block 140.

In the conventional FBMC system, since the adjacent QAM signals are spread and the results of spreading are overlapped in the spreading process for performing frequency domain filtering, it becomes impossible to recover the signal. In order to overcome this problem, the FBMC system uses OQAM, which arranges the in-phase (real) and quadrature-phase (imaginary) components to cross each other in the tie-frequency resource.

In order to perform frequency domain filtering in the conventional system, the size of the IFFT 130 should be increased as much as K times corresponding to the overlapping factor of the prototype filter in comparison with OFDM, and the total system complexity increases. Since the same problem also occurs at the receiver, the FFT size of the receiver should be increased also as much as K times, and this increases the complexity of the receiver.

FIG. 4 is block diagram illustrating a receiver for use in the conventional communication system.

Referring to FIG. 4, the reception signal x(n) is converted to parallel signals by an S/P converter 210 and then FFT-ed by a Fast Fourier Transform (FFT) 220. Next, the signal is equalized by a frequency equalizer 230 and then frequency-domain-filtered by a frequency de-spreader 240 so as to be recovered. If the QAM signal is used in the frequency domain filtering process as described above, this makes it impossible to cancel the intrinsic interference.

DISCLOSURE OF INVENTION

Technical Problem

Since the filtering results of the adjacent signals are overlapped in the above described conventional FBMC communication system adopting the technology of (1) or the technology of (2), the OQAM signal should be used instead of the QAM signal. As a consequence, the conventional FBMC communication system has a drawback in the difficulty of combining it with a Multiple-Input Multiple-Output (MIMO).

Particularly, in the technology of (2), it is advantageous to use a one tap frequency domain equalizer at the receiver because of the frequency domain filtering, while it is disadvantageous to increase the complexity because the IFFT and FFT sizes increase K times.

The present invention provides a method and apparatus for transmitting QAM signals in the FBMC communication system by separating the signals corresponding to the even-indexed subcarriers and the signals corresponding to the odd-indexed subcarriers and transmitting the signals filtered using the orthogonality of the filters.

Also, the present invention provides a method and apparatus for transmitting/receiving signals efficiently with low complexity by overcoming the shortcoming of increasing the IFFT and FFT sizes by as much as the overlapping factor K in the conventional OQAM-based FBMC communication system and using a frequency domain one-tap equalizer at the receiver.

Solution to Problem

In order to solve the above problems, in accordance with an aspect of the present invention, a method for transmitting signals in an FBMC communication system includes sorting at least two QAM signals into a plurality of groups, filtering the respective groups, and transmitting the QAM signals included in the filtered groups in a state of being overlapped in time domain.

In accordance with another aspect of the present invention, a method for receiving signals in an FBMC communication system includes sorting received signals into a plurality of groups, filtering respective groups, and recovering at least two QAM signals by equalizing the filtering result in frequency domain.

In accordance with another aspect of the present invention, a transmission apparatus for use in an FBMC communication system includes a filtering unit which filters at least two QAM signals sorted into a plurality of groups, an overlapping unit which overlaps the QAM signals included in the filtered groups in time domain, and a communication unit which transmits the overlapped signals to outside of the apparatus.

In accordance with still another aspect of the present invention, a reception apparatus for use in an FBMC communication system includes a communication unit which receives signals, a filtering unit which sorts the received signals into a plurality of groups and filters the groups of the received signals, and an equalizer which equalizes the filtering result in frequency domain to recover at least two QAM signals.

Advantageous Effects of Invention

The transmission/reception method and apparatus of making it possible to transmit the QAM signal as proposed in the present invention are capable of mitigating the intrinsic interference caused by filtering separation.

Also, the transmission/reception method and apparatus of making it possible to transmit the QAM signal as proposed in the present invention can process complex signals so as to facilitate combination with MIMO while maintaining adaptation of the QAM-based techniques for OFDM to the FBMC.

BRIEF DESCRIPTION OF DRAWINGS

FIG. 3 is a diagram illustrating a frequency domain filtering process of the legacy FBMC communication system;

FIG. 6 is a diagram illustrating a frequency domain filtering process of a transmission apparatus according to the present invention;

FIG. 9 is a diagram illustrating an exemplary operation of overlapping IFFT output signals in the transmission apparatus according to the present invention.

FIG. 12 is a diagram illustrating an example of overlap/sum of successive FBMC symbols;

MODE FOR THE INVENTION

Embodiments of the present invention are directed to signal transmission and reception apparatuses. The transmission and reception apparatus may be a system, a subscriber unit, a subscriber station, a mobile station, a mobile unit, a remote station, a remote unit, a device, a user terminal, a terminal, a radio communication device, a user agent, a user device, or User Equipment (UE). The transmission and reception apparatus may be a cellular phone, a Personal Digital Assistant (PDA), a radio access-enabled handheld device, a computing device, or a processing device connected to a wireless modem.

The terminology used herein is for the purpose of describing particular embodiments only and is not intended to be limiting of the invention. Unless otherwise defined, all terms used herein have the same meaning as commonly understood by one of ordinary skill in the art to which this invention pertains, and they should be interpreted neither as having an excessively comprehensive meaning nor as having an excessively contracted meaning.

As used herein, the singular forms "a", "an", and "the" are intended to include the plural forms as well, unless the context clearly indicates otherwise. It will be further understood that the terms "comprises" "comprising," "includes" and/or "including", when used herein, specify the presence of stated features, integers, steps, operations, elements, and/or components; but they do not preclude the presence or addition of one or more other features, steps, operations, elements, components, and/or groups thereof.

Exemplary embodiments of the present invention are described in detail with reference to the accompanying drawings. Detailed descriptions of well-known functions and structures incorporated herein may be omitted to avoid obscuring the subject matter of the present invention. Further, the following terms are defined in consideration of the functionality in the present invention and may vary according to the intention of a user or an operator, usage, etc. Therefore, the definition should be made on the basis of the overall content of the present specification FIG. 5 is a block diagram illustrating a configuration of a transmission apparatus according to the present invention.

Figure 1:
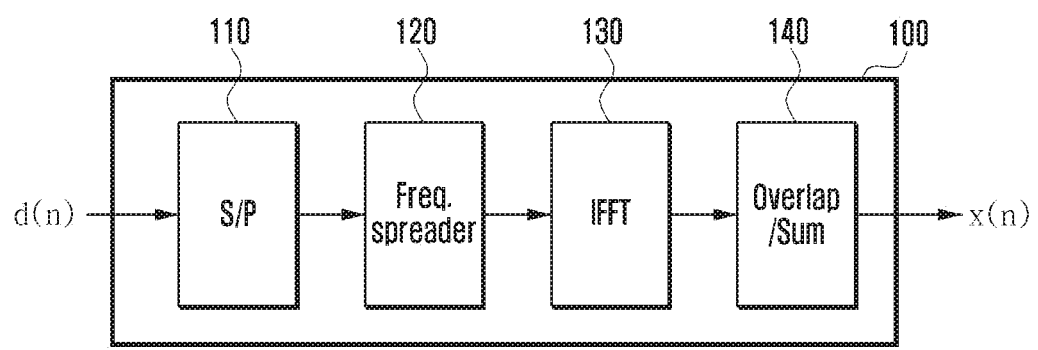
FIG. 1 is a block diagram illustrating a transmitter for use in a conventional FBMC communication system.
Figure 2:
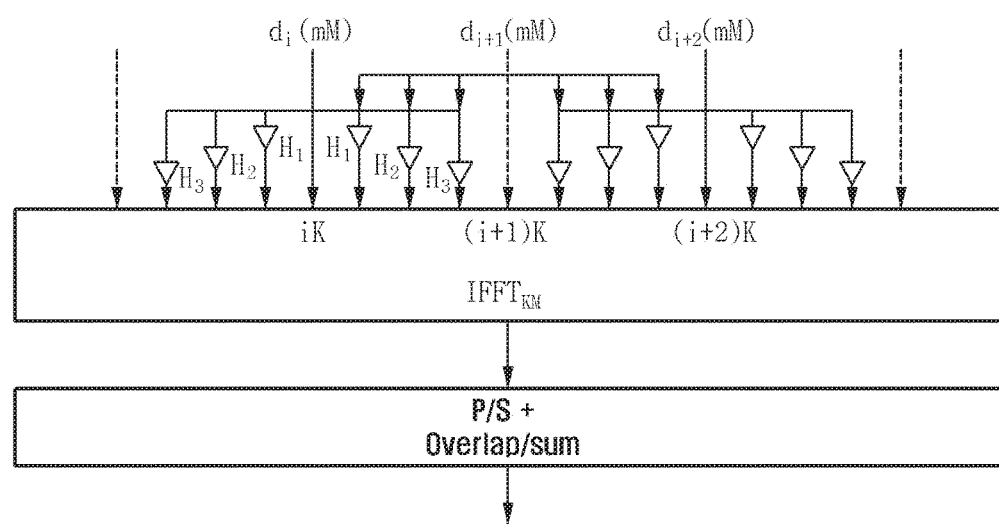
FIG. 2 is a diagram illustrating a signal flow in the transmitter for use in the conventional FBMC communication system.
Figure 4:
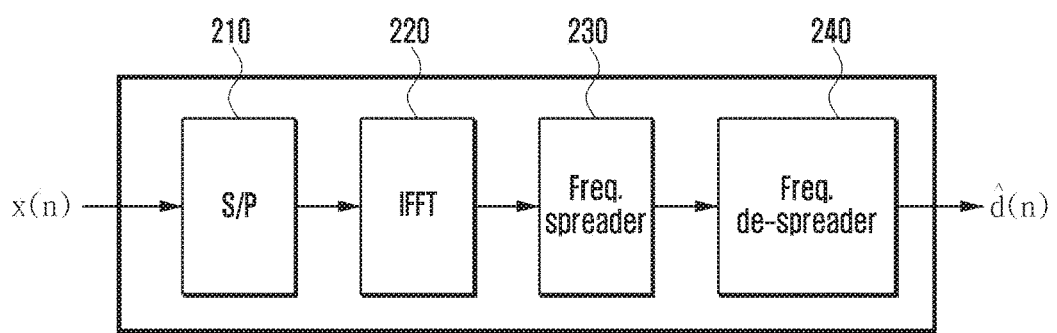
FIG. 4 is a block diagram illustrating a reception apparatus for use in the legacy FBMC communication system.
Figure 5:
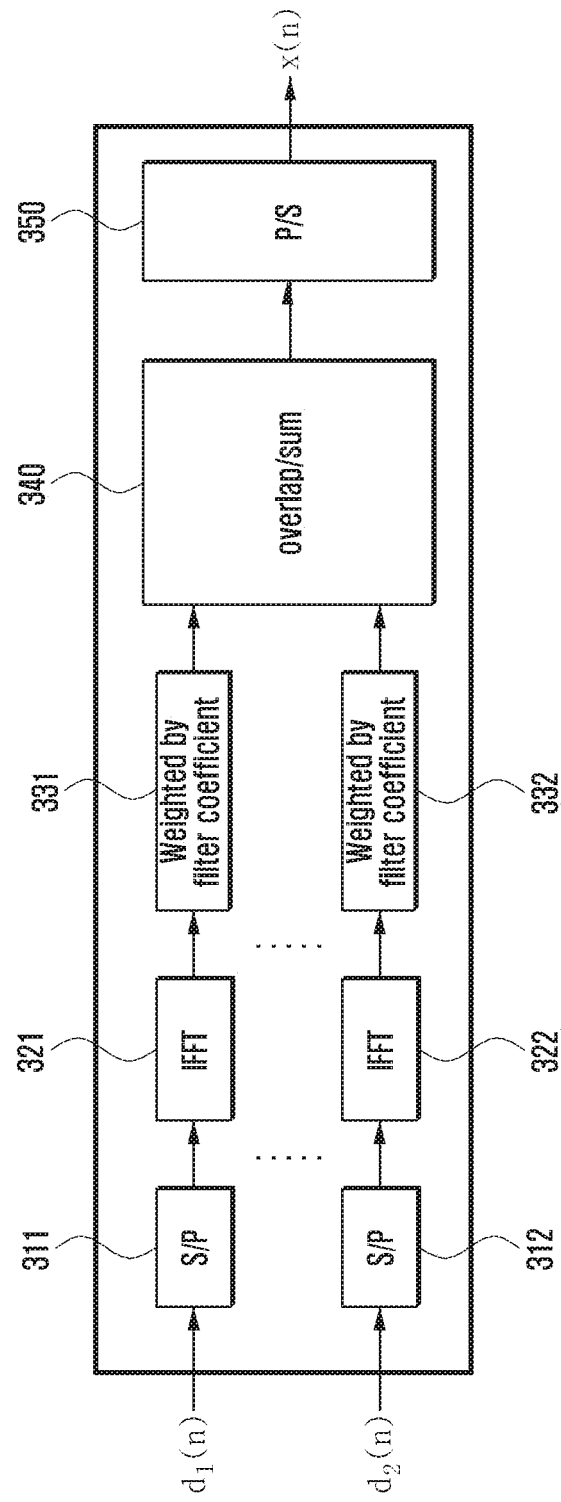
FIG. 5 is a block diagram illustrating a transmission apparatus according to the present invention.

Referring to FIG. 5, the transmission apparatus 300 according to the present invention includes a plurality of S/P converters 311 and 312, a plurality of IFFTs 321 and 322, and a plurality of weighted sum blocks 331 and 332. The S/P converters 311 and 312, the IFFTs 321 and 322, and the weighted sum blocks 331 and 332 may involve the operation of filtering QAM signals. Thus, the S/P converters 311 and 312, the IFFTs 321 and 322, and the weighted sum blocks 331 and 332 may be referred to as a filtering unit individually or integrally.

As shown in FIGS. 5 and 6, the transmission apparatus according to the present invention splits M QAM signals into first and second groups to perform filtering per group. At this time, the transmission apparatus may sort the adjacent QAM signals into different groups. For example, the transmission apparatus 300 may sort the M QAM signals into a group of even-indexed signals and a group of odd-indexed signals. In this way, the transmission apparatus 300 according to the present invention protects against intrinsic interference between neighboring signals as shown in FIG. 6.

In various embodiments of the present invention, the filtering operation may be performed with group-specific filters having a complex relationship with each other. In an exemplary case where the first and second groups are filtered separately, the first and second groups may be filtered by respective first and second filters having the complex relationship. That is, the filtering coefficients of the filter applied to the second group may be the complex values of the filter coefficients of the filter applied to the first group. In an embodiment, if the coefficients of the filter applied to the first group are represented in the real domain, the coefficients of the filter applied to the second group are represented in the complex domain. That is, if the first filter applied to the first group has the real domain filter coefficients of $H=[H_2\ H_1\ H_0\ H_1\ H_2]$, the second filter applied to the second group may have the complex domain filter coefficients of $G=[G_2\ G_1\ G_0\ G_1\ G_2]=[jH_2\ jH_1\ jH_0\ jH_1\ jH_2]$.

Also, according to the present invention, the transmission apparatus 300 may perform the separated filtering in a frequency spread scheme before IFFT or, instead of convolution, in a way of multiplication on the time axis after IFFT in order to avoid increase of complexity. A detailed description thereof is made hereinafter.

Figure 7:
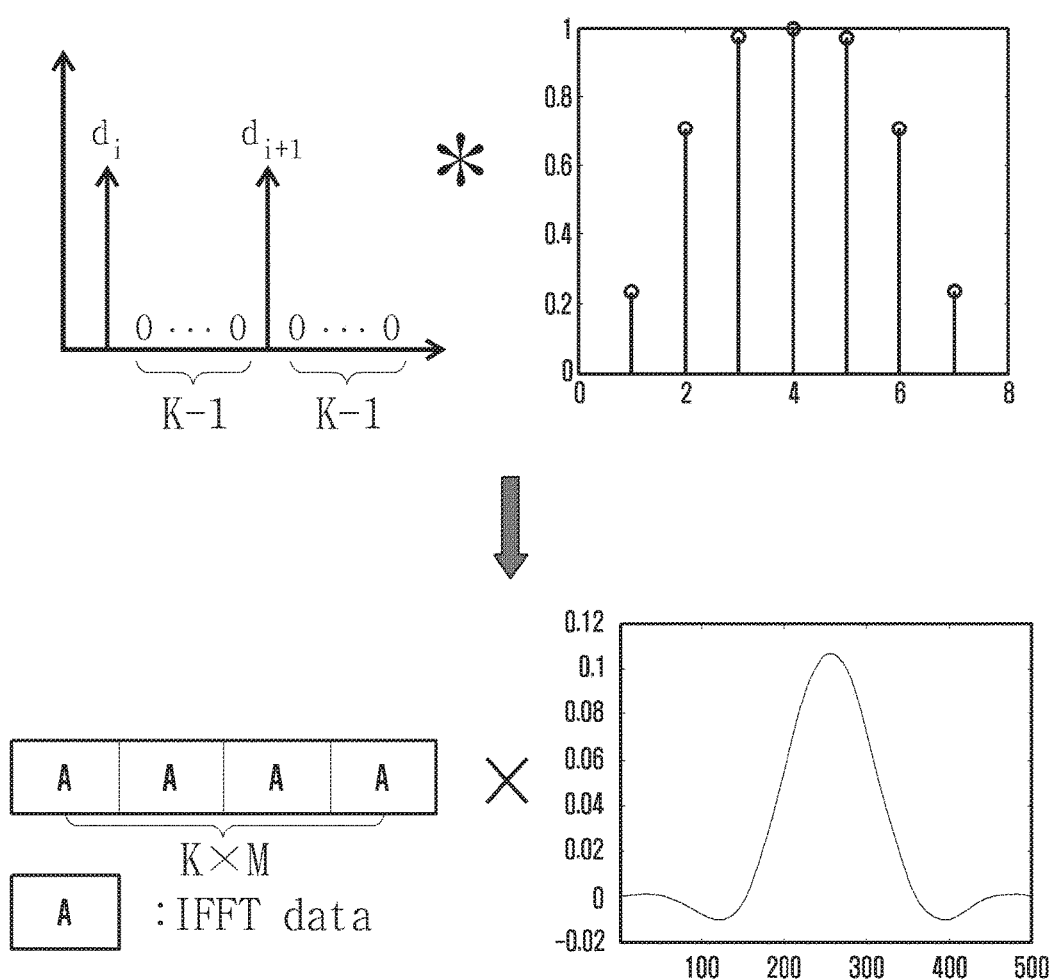
FIG. 7 is a diagram illustrating a frequency domain convolution operation modified with a time domain multiplication operation.

The legacy filtering process based on multiplication after spreading in the frequency domain as shown in FIG. 6 may be reinterpreted as convolution of a signal characterized by inserting zeros between QAM signals and the filter coefficient to a QAM signal. At this time, if the original QAM signals to be filtered are transformed to time domain signals because of the zeros inserted inbetween the signals, the IFFT output signals appear in the form of a signal repeated K−1 times. Accordingly, the filtering process can be reinterpreted as a weighted sum operation between IFFT output data corresponding to M signals and KM time domain filter coefficients in unit of block as shown in FIG. 7. FIG. 7 shows an exemplary case where K is 4.

Figure 8:
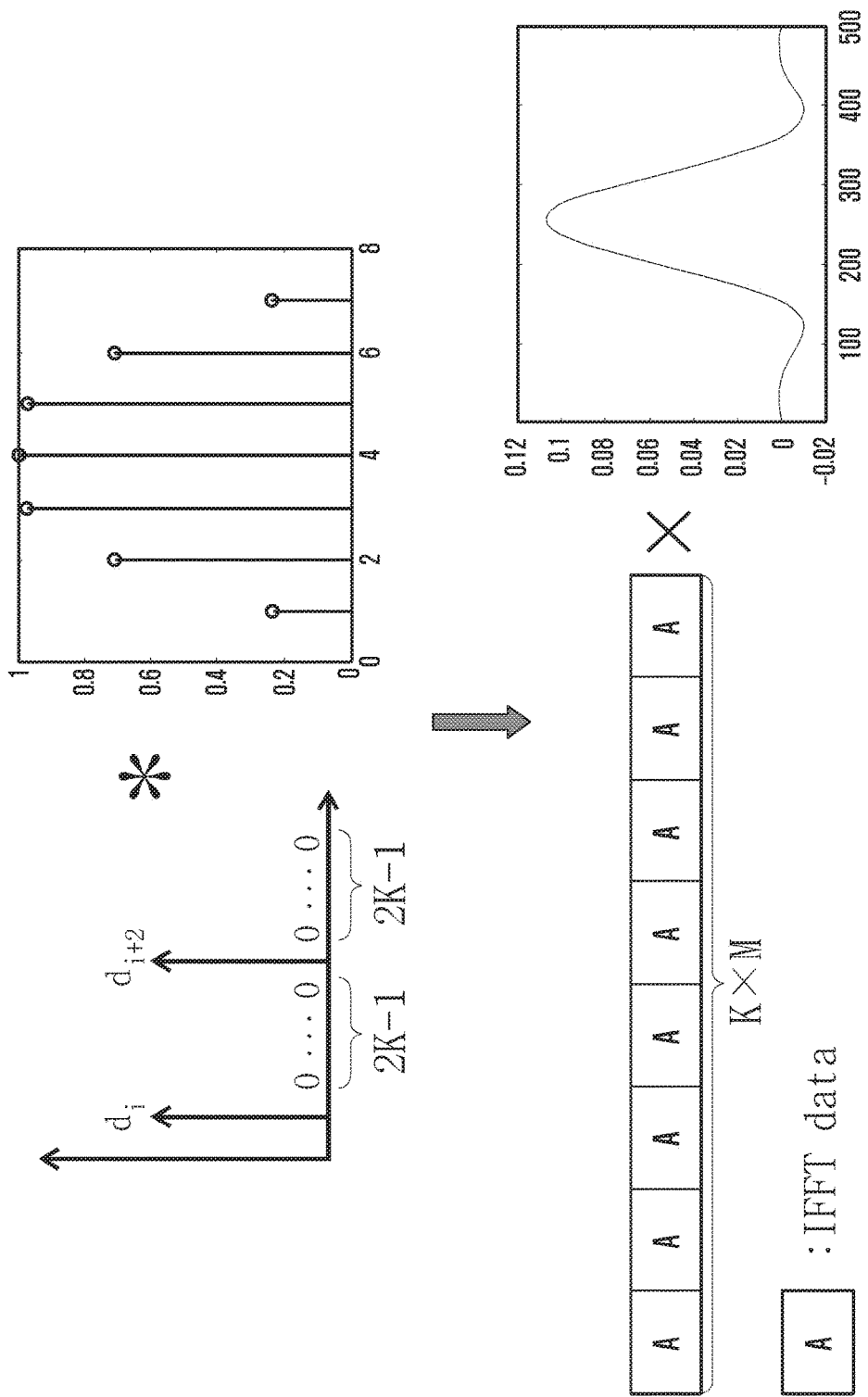
FIG. 8 is a diagram illustrating a time domain multiplication operation modified with a QAM signal convolution operation according to the present invention.

Referring to FIG. 8, in the case of sorting M QAM signals into two groups of M/2 even-indexed QAM signals and M/2 odd-indexed QAM signals, 2K−1 zeros are inserted between signals, which is unlike the case of FIG. 7 in which K−1 zeros are inserted. Accordingly, reinterpreting the IFFT operation in the convolution rule, the IFFT output signal appears in the form of repeating the IFFT output block of the signal 2K−1 times with the size of M/2. The transmission apparatus 300 may perform filtering by multiplying the IFFT output signal by KM time domain filter coefficients. At this time, the block of performing the multiplication operation is referred to as "multiplier".

In the present invention, the transmission apparatus 300 performs an overlap/sum operation in unit of 2K block by means of the overlap/sum block 340 and P/S converter 350 in the time domain. The transmission apparatus transmits the IFFT output blocks for the first and second groups formed as shown in FIG. 6, i.e. the IFFT output blocks corresponding to the even-indexed and odd-indexed signals, in the state of being overlapped as shown in FIG. 9. Particularly in an embodiment of the present invention, the transmission apparatus 300 overlaps the IFFT output signals such that one of the IFFT outputs signals of one of the first and second groups are arranged in the inverse order. The overlap/sum block 340 may be referred to as "overlap unit" in an embodiment of the present invention. In the case of transmitting the signals as overlapped as shown in FIG. 9 using the orthogonality between filters in the FBMC transmission/reception structure, the even-indexed and odd-indexed signals do not affect each other; thus, it is possible to transmit QAM signals.

The overlapped signals many be transmitted to the reception apparatus by means of a communication unit of the transmission apparatus.

Figure 10:
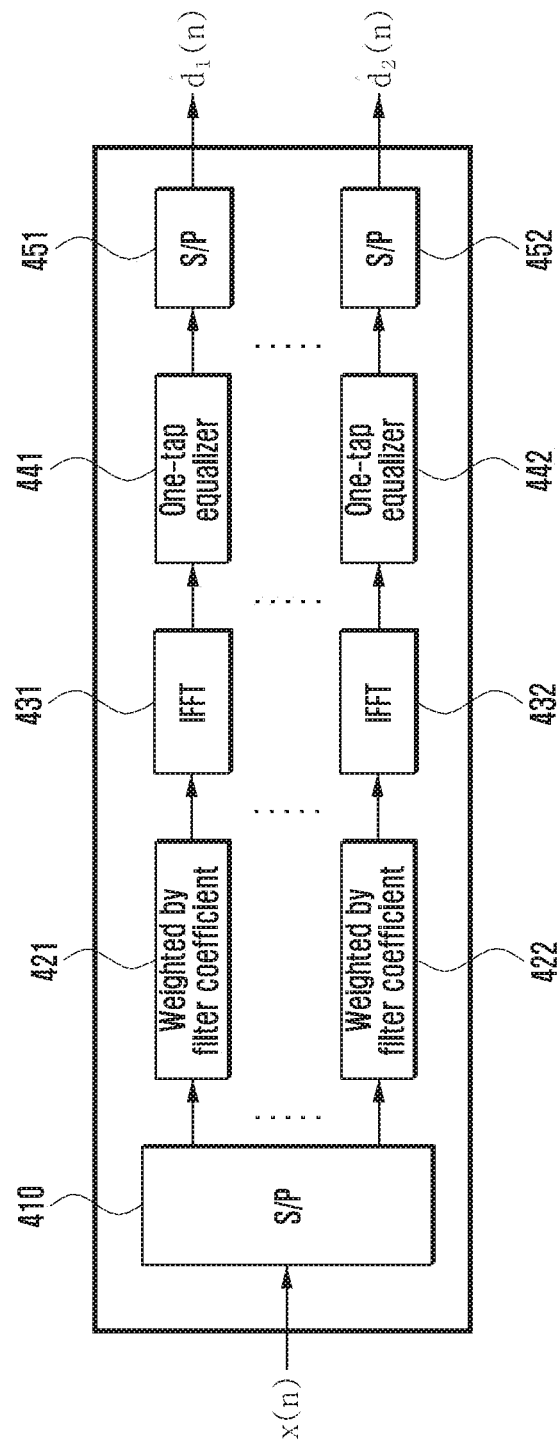
FIG. 10 is a block diagram illustrating a configuration of the reception apparatus according to the present invention.

FIG. 10 is a block diagram illustrating a configuration of the reception apparatus according to the present invention.

Referring to FIG. 10, the reception apparatus 400 according to the present invention receives signals by means of a communication unit. The reception signal passes an S/P converter 410, weighted sum blocks 421 and 422, and FFT converters 431 and 432, and then one-tap equalizers 441 and 442 perform one-tap equalization process on the signals in the frequency domain. Finally, P/S converters 451 and 452 perform P/S conversion on the received signal to recover the original signal.

Descriptions in detail are made hereinafter of the signal conversion procedures in the transmission apparatus and reception apparatus of the present invention.

Figure 11:
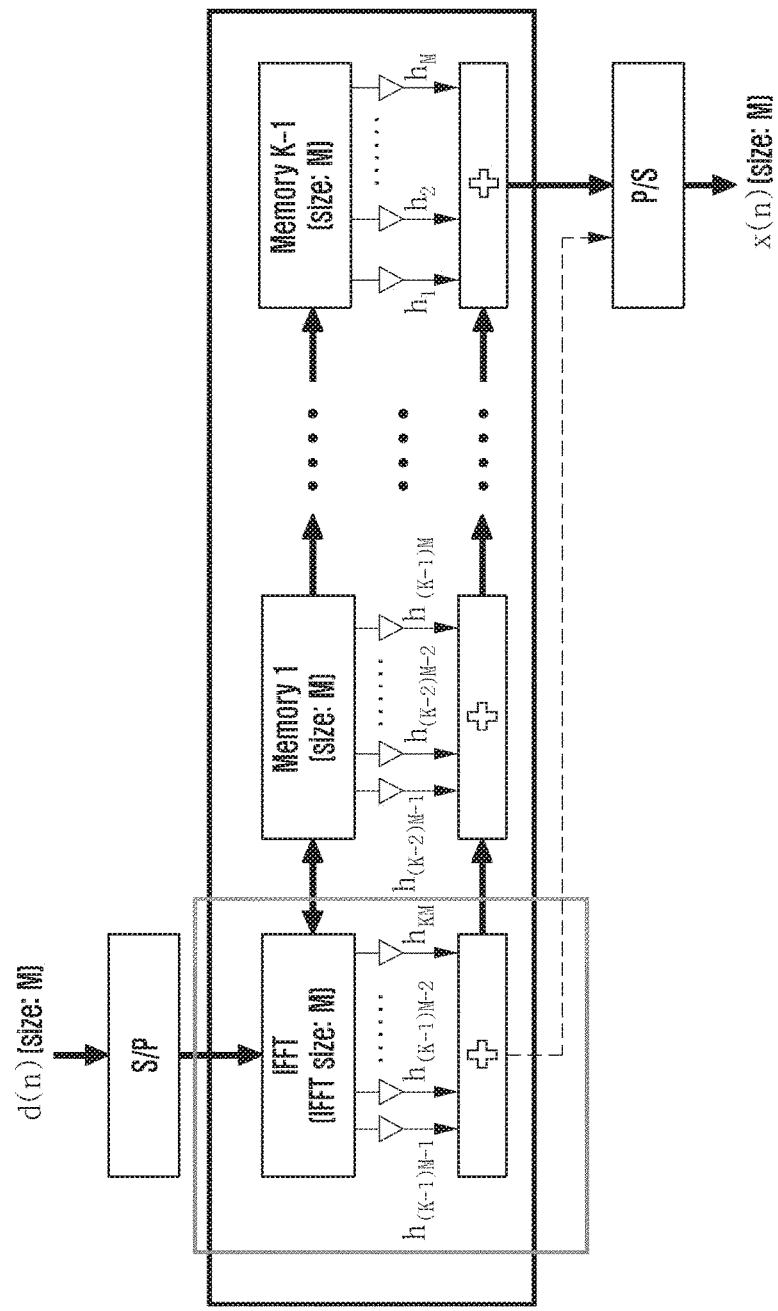
FIG. 11 is a diagram illustrating a signal flow in the transmission apparatus according to the present invention.

FIG. 11 is a diagram illustrating a signal flow in the transmission apparatus according to the present invention.

Referring to FIG. 11, the transmission signal d(n) consists of M signals. According to the present invention, the signals are sorted into first and second groups. Accordingly, the group-specific signals $d_1(n)$ and $d_2(n)$ have a size of M/2. In an embodiment of the present invention, the signals are sorted into two groups. For example, the signals are sorted into the first group made up of even-indexed signals and the second group made up of odd-indexed signals.

The signals included in the first and second groups pass through group-specific SP conversion and group-specific IFFT operations so as to be converted to the time domain data as shown in FIG. 6. FIG. 6 exemplifies the operation of filtering even-indexed signals (upper part) and odd-indexed signals (lower part) separately. Referring to FIG. 6, if the neighboring signals are sorted into different groups, the separated signals pass through respective SP conversion and IFFT conversion operations so as to avoid intrinsic interference as shown in FIG. 3.

The output signals of the IFFT block of FIG. 11 are stored in the $1^{st}$ to $(2K-2)^{th}$ memories sequentially. Afterward, the signals stored in the memories are overlapped through the add operation with the KM time domain filter coefficients in unit of M/2 blocks and then transmitted outside through the P/S block. In an embodiment of the present invention, the time domain filter coefficients may have different values depending on the value K.

FIG. 12 is a diagram illustrating an example of overlap/sum of successive FBMC symbols.

In FIG. 12, the horizontal axis denotes time, and one sub-block denotes a signal as a result of applying M/2-IFFT to M/2 QAM signals. The M/2 QAM signals to which the M/2-IFFT is applied are extended 2K−1 times and multiplied by KM time domain filter coefficients. In the case of odd-indexed signals, the 2K blocks acquired after multiplication are changed in sign (−+−+ . . . ) and rearranged in the inverse order. Accordingly, K FBMC symbols aligned on the same vertical column are overlapped and then finally summed so as to be transmitted to the reception apparatus.

Figure 13:
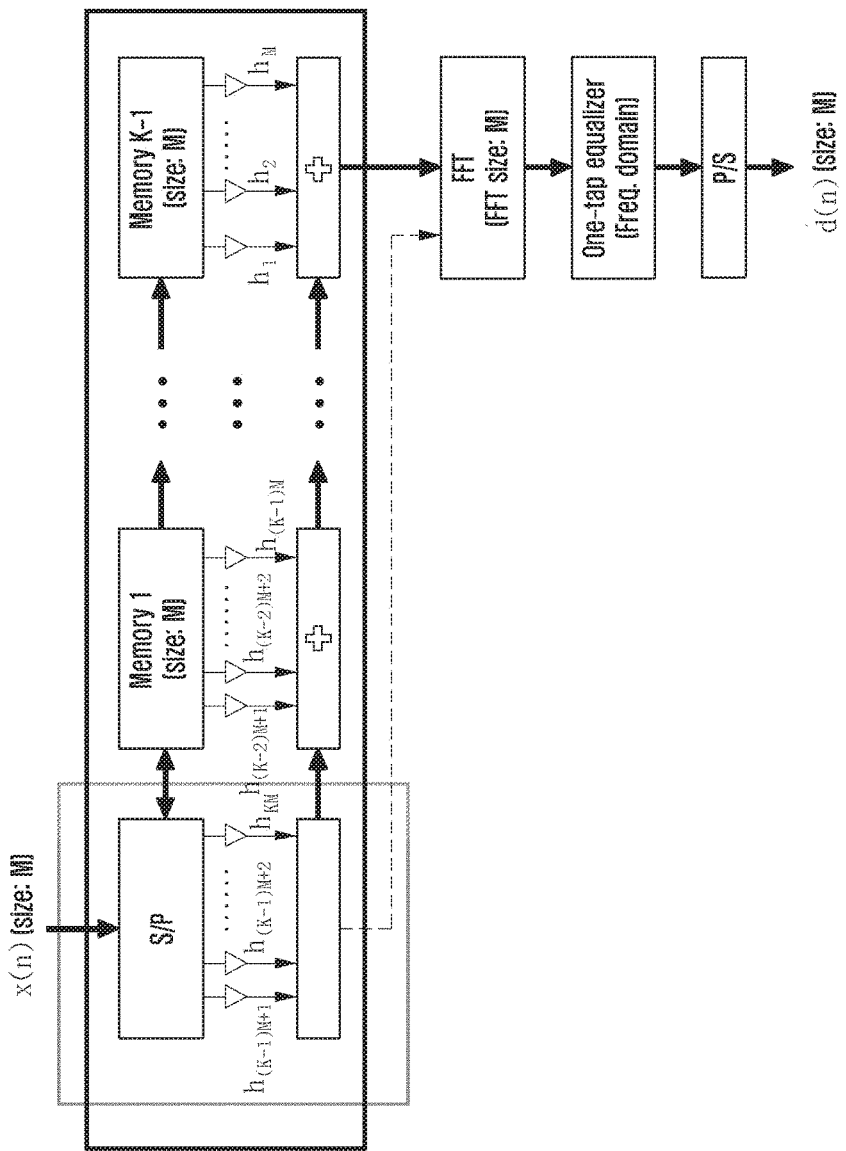
FIG. 13 is a diagram illustrating a signal flow in the reception apparatus according to the present invention.

FIG. 13 is a diagram illustrating a signal flow in the reception apparatus according to the present invention.

Referring to FIG. 13, the signal in the reception apparatus flows in the inverse order of the signal flow in the transmission apparatus before passing the equalizer. In detail, the reception apparatus stores the signal with the reception size of M in the memories sequentially. Next, the reception apparatus multiples the signals stored in the respective memories by the KM time domain filter coefficients and performs add operation in unit of block to generate FFT input signal with the size of M. Afterward, the reception apparatus performs the FFT operation of the size of M/2 and recovers the original signal using the one-tap equalizer in the frequency domain.

Figure 14:
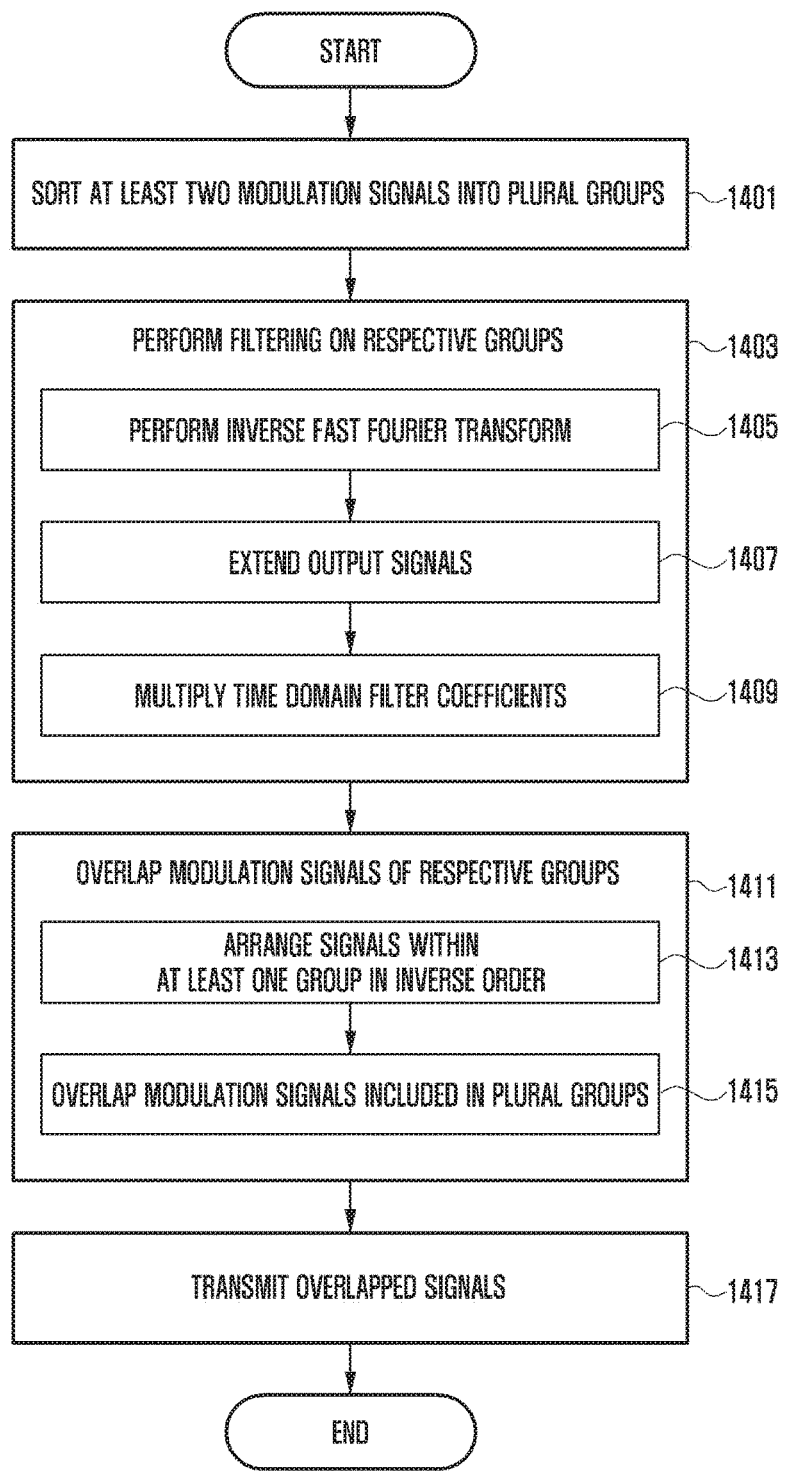
FIG. 14 is a flowchart illustrating a transmission method according to the present invention.

FIG. 14 is a flowchart illustrating a transmission method according to the present invention.

Referring to FIG. 14, the transmission apparatus sorts at least two modulation signals into multiple groups at step 1401. The transmission apparatus may sort M modulation signals into a plurality of groups, e.g. the first and second groups. At this time, the transmission apparatus may sort the modulation signals such that the neighboring signals belong to different groups. In an embodiment, the transmission apparatus may sort the modulation signals into two groups, i.e. an even-indexed modulation signal group and an odd-numbered modulation signal group.

Next, the transmission apparatus performs filtering for the respective groups at step 1403. The transmission apparatus performs IFFT on the modulation signals included in the respective groups at step 1405, extends the IFFT-ed output signals to MK signals at step 1407, and multiplies the MK output signals by time domain filter coefficients at step 1409.

Afterward, the transmission apparatus overlaps the filtered group-specific modulation signals at step 1411. In an embodiment, the transmission apparatus rearranges the modulation signals included in at least one of the groups at step 1413 and overlaps the filtered group-specific modulation signals at step 1415.

Finally, the transmission apparatus transmits the overlapped signals to outside of the apparatus at step 1417.

Figure 15:
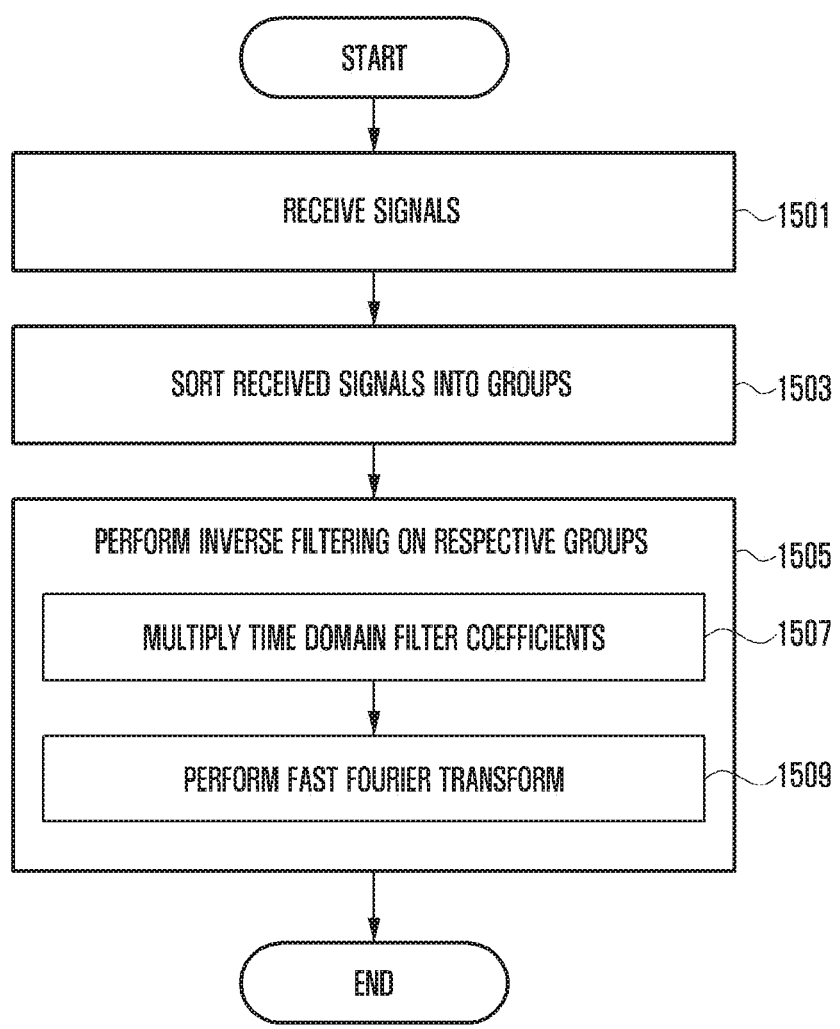
FIG. 15 is a flowchart illustrating a reception method according to the present invention.

FIG. 15 is a flowchart illustrating a reception method according to the present invention.

Referring to FIG. 15, the reception apparatus receives signals at step 1501.

Next, the reception apparatus splits the received signals into a plurality of groups at step 1503. The reception apparatus performs inverse filtering on the split groups at step 1505. That is, the reception apparatus multiplies the received group-specific signals by time domain filter coefficients at step 1507 and performs Fourier Transform on the signals output by multiplying the filter coefficients at step 1509.

As described above, the reception apparatus processes the Fourier Transformed output signals into the recovered signals.

As described above, the transmission apparatus of the present invention sorts the QAM signals into a plurality of groups to separate the filtering processes for the respective groups and transmits the QAM signals in the state of being overlapped using the orthogonality of the filters. The transmission apparatus performs filtering through weighted sum in the time domain using the repetitive characteristics of IFFT and FFT so as to reduce the complexity.

Although various embodiments of the present disclosure have been described using specific terms, the specification and drawings are to be regarded in an illustrative rather than a restrictive sense in order to help understand the present invention. Therefore, it should be construed that the scope of the present invention encompasses various modifications and changes made thereto without departing from the broader spirit and scope of the invention.

The invention claimed is:

1. A method for transmitting signals in a multicarrier communication system, the method comprising:
   sorting modulated signals into at least two groups, each of the at least two groups including a plurality of modulated signals, each modulated signal corresponding to a different subcarrier;
   filtering each of the at least two groups respectively;
   overlapping filtered modulated signals included in the filtered groups in time domain; and
   transmitting the overlapped filtered modulated signals,
   wherein the sorting of the modulated signals into the at least two groups comprises sorting even-indexed modulated signals among the modulated signals into a first group and odd-indexed modulated signals among the modulated signals into a second group.

2. The method of claim 1, wherein the sorting of the modulated signals into the at least two groups comprises sorting neighboring modulated signals into different groups.

3. The method of claim 1, wherein the filtering of each of the at least two groups comprises:
   performing inverse fourier transform on the respective groups; and
   multiplying the inverse fourier transform output signals by time domain filter coefficients.

4. The method of claim 3, wherein the multiplying of the inverse fourier transform output signals comprises:
   extending M/2 output inverse fourier transform output signals to M/2*2K signals per group; and
   multiplying the M/2*2K output signals by M/2*2K time domain filter coefficients.

5. The method of claim 4, wherein the extending comprises repeating the M/2 inverse fourier transform output signals of each group 2K times.

6. The method of claim 4, where the extending comprises inserting 2K−1 zero symbols between M/2 inverse fourier transform output signals.

7. The method of claim 1, wherein the transmitting of the overlapped filtered modulated signals comprises:
   arranging the filtered modulated signals included in at least one of the filtered groups in an inverse order; and
   overlapping the filtered modulated signals arranged in the inverse order in the corresponding group with the filtered modulated signals included in the other group.

8. The method of claim 1, wherein the modulated signals are Quadrature Amplitude Modulation (QAM) signals.

9. The method of claim 1,
   wherein the sorting of the modulated signals comprises sorting the modulated signals into first and second groups, and
   wherein the filtering of each of the at least two groups comprises filtering the first and second groups using first and second filter respectively.

10. The method of claim 1, wherein the at least two groups include the same number of modulated signals in each group.

11. A transmission apparatus for use in a multicarrier communication system, the apparatus comprising:
   a filtering unit configured to filter each of at least two groups respectively, wherein modulated signals are sorted into the at least two groups, each of the at least two groups including a plurality of modulated signals, each modulated signal corresponding to a different subcarrier;

an overlapping unit configured to overlap filtered modulated signals included in the filtered groups in time domain; and a communication unit configured to transmit the overlapped filtered modulated signals, wherein the modulated signals are sorted into a first group for even-indexed modulated signal among the modulated signals and a second group for odd-indexed modulated signal among the modulated signals.

12. The apparatus of claim 11, wherein the modulated signals are the neighboring modulated signals sorted into different groups.

13. The apparatus of claim 11, wherein the filtering unit comprises:

a fourier transform unit configured to perform inverse fourier transform on the respective groups; and a multiplier configured to multiply the inverse fourier transform output signals by time domain filter coefficients.

14. The apparatus of claim 13, wherein the multiplier is configured to extend M/2 output inverse fourier transform output signals to M/2*2K signals per group and multiply the M/2*2K output signals by M/2*2K time domain filter coefficients.

15. The apparatus of claim 14, wherein the multiplier is configured to repeat the M/2 inverse fourier transform output signals of each group 2K times.

16. The apparatus of claim 14, wherein the multiplier is configured to insert 2K−1 zero symbols between M/2 inverse fourier transform output signals.

17. The apparatus of claim 11, wherein the overlapping unit is configured to arrange the filtered modulated signals included in at least one of the filtered groups in an inverse order and overlap the filtered modulated signals arranged in the inverse order in the corresponding group with the filtered modulated signals included in the other group.

18. The apparatus of claim 11, wherein the modulated signals are Quadrature Amplitude Modulation (QAM) signals.

19. The apparatus of claim 11, wherein the filtering unit is configured to sort the modulated signals into first and second groups and filter the first and second groups using first and second filter respectively.

20. The apparatus of claim 11, wherein the at least two groups include the same number of modulated signals in each group.

* * * * *